July 7, 1936. B. E. MEACHAM 2,046,920
VALVE
Filed March 27, 1935
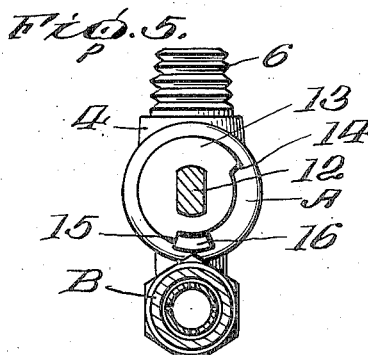
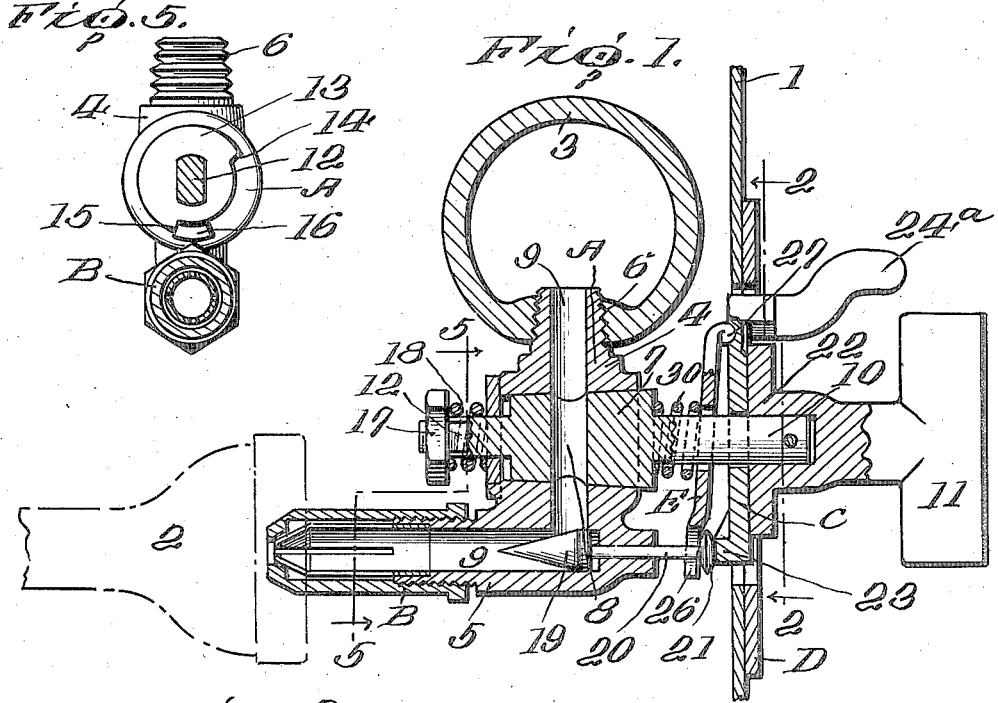
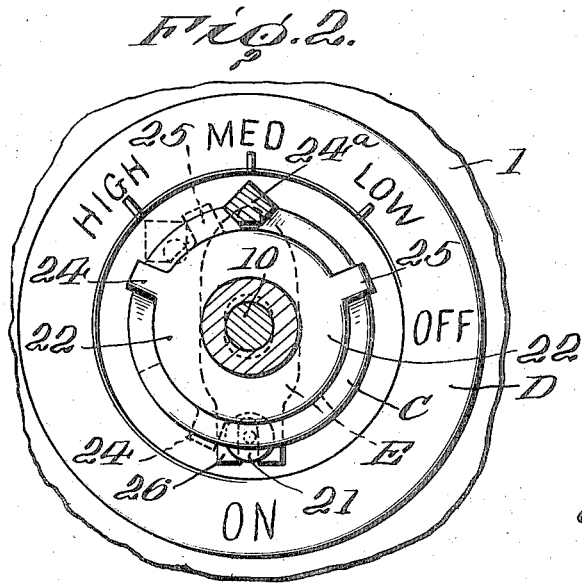
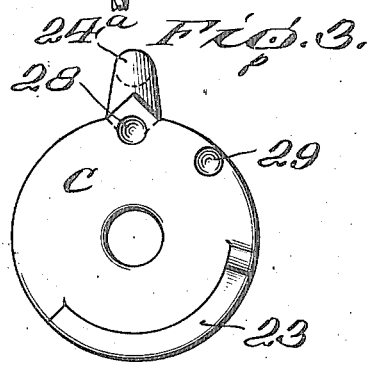
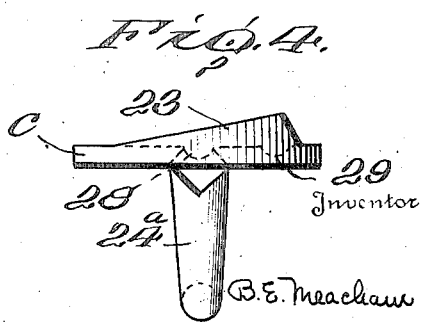
Inventor
B. E. Meacham
By Pattison, Wright and Pattison
Attorneys Patented July 7, 1936

2,046,920

UNITED STATES PATENT OFFICE 2,046,920

VALVE

Benjamin Edward Meacham, Lorain, Ohio, assignor to American Stove Company, St. Louis, Mo., a corporation of New Jersey Application March 27, 1935, Serial No. 13,352

18 Claims. (Cl. 277—64)

This invention relates to improvements in valves, and is directed more particularly to an improved gas valve or a gas cock for use on heavy duty gas ranges. By heavy duty gas ranges reference is had to that type of gas cooking ranges used in hotels, restaurants or the like. Heavy duty ranges ordinarily have solid cooking tops in which some heat is maintained throughout the greater part of every twenty-four hours. When a range is used in this manner, the gas burners are almost constantly in use, but are only set to deliver their maximum heat during rush or meal hours.

One of the objects of the invention is the provision of an improved valve or gas cock for a gas cooking range of the type described.

Another object of the invention is the provision of a gas valve or gas cock which is quickly, easily, and accurately adjusted or positioned to control the amount of fuel passing to a burner.

Other specific objects, novel features of construction and improved results of the present invention will be set forth more in detail in the following description when read in the light of the accompanying drawing.

In the drawing:

Figure 1 is a vertical sectional view through the improved valve.

Fig. 2 is a vertical sectional view taken at right angles to the view appearing in Fig. 1, and being on the line 2—2 of Fig. 1, looking in the direction indicated by arrows.

Fig. 3 is a plan view of the cam-carrying disc.

Fig. 4 is a top or edge view of the disc appearing in Fig. 3.

Fig. 5 is a vertical sectional view taken on the line 5—5 of Fig. 1, looking in the direction indicated by arrow.

Having reference now to the drawing which illustrates an embodiment of the improved invention and in which like parts are designated by similar reference numerals throughout the description, 1 indicates the front or face plate of a gas cooking range behind which is positioned a cooking burner, the gas receiving and mixing bell 2 of which appears in dotted lines in Fig. 1 of the drawing.

The main gas supply conduit or manifold appears at 3 and delivers gas to the improved valve or gas cock which is designated as an entirety by A.

The gas cock or valve A is an angular fitting comprising legs 4 and 5 arranged at right angles to one another. One end of the leg 4 has threaded gas-tight connection as at 6, with the gas supply pipe 3, while its other end is formed integral with the other leg 5 of the valve housing or fitting A.

The valve illustrated is of the rotary plug type. The plug comprises a conical portion 7, which extends transverse the leg 4 of the valve-housing in a suitable transverse opening and the plug is provided with a transverse gas or fuel passageway 8, which by the rotation of the valve can be made to communicate with the gas pasageway 9, which extends through both of the legs 4 and 5 of the valve-housing or fitting A. The end of the leg 5 of the valve-housing is provided with an extension in the form of a cap B, which forms a jet which extends into and delivers fuel to the bell 2 of the burner.

One end of the plug 7 is provided with an operating stem or shaft 10, which extends through and beyond the range front panel 1, and carries an operating handle or knob 11, by means of which the range operator can rotate the plug to open or close the valve to the passage of fuel.

The other end of the plug 7 is provided with a shaft or stem 12, which extends outwardly beyond the leg 4 of the valve-housing A and is of approximately rectangular shape in cross-section, as clearly appears in Fig. 5 of the drawing. A washer 13 is mounted on and rotatable with the shaft or stem 12 and has its peripheral edge cut out or away to form spaced shoulders 14 and 15 which upon rotation of the plug limit the rotary movement of the plug to a quarter revolution through engagement with a stop 16 formed as an integral part of the valve-housing A.

The outer end of the shaft or stem 12 is threaded to adjustably carry a nut 17, which forms an adjustable abutment for a coil spring 18 which surrounds the stem 12 and tends at all times to hold the washer 13 against the outer face of the valve-housing and also at all times exerts an adjustable resilient tension upon the plug 7 to maintain it in gas-tight relationship within its seat in the valve-housing.

Due to the angular relationship of the legs 4 and 5 of the valve-housing the fuel passageway 9 has intermediate its length a rightangle turn and at this turn and reciprocal within the leg 5 of the housing there is positioned a conical piston valve 19 having a stem 20 extending upwardly through and beyond the valve-housing, but stopping short of the front panel 1 of the range in an enlarged head 21.

Behind the hub portion 22 of the plug valve operating handle 11 and loosely mounted on the plug stem 10, there is a disc C which is provided with a cam 23 positioned at and extending throughout a portion only of its peripheral edge. This cam disc is provided with an operating handle 24ª, which extends outwardly through the range front panel 1. The hub 22 of the plug operating handle 11 is provided with outwardly extending arms 24 and 25, which are in the path of travel of the cam disc operating handle 24ª for a particular purpose which will hereinafter appear.

At the front of the range panel 1 and surrounding both of the operating handles 11 and 24ª there is positioned an indicator dial D carrying on its face designations to indicate the "on" and "off" positions of the rotary plug valve and to indicate the "high", "medium" and "low" positions of the conical piston valve 19.

A lever or arm E loosely surrounds the plug-valve stem 10 behind the cam disc C and has a forked or slotted end 26 which straddles the piston valve stem 20 behind its enlarged head 21. The opposite end of this member terminates in a knob 28 which is adapted to selectively engage the rounded depressions 28 and 29, arranged in spaced relation in the rear face of the cam disc C. A coil spring 30 tends at all times to urge the knob of this member towards the cam disc and to maintain the enlarged head 21 of the piston valve at all times in engagement with the cam 23 of the cam disc. The depressions 28 and 29 of the cam disc are positioned to indicate and coincide with the high and medium designations carried by the indicator plate D, and as the cam is rotated by its handle 24 the knob 27 of the lever E will ride out of and snap into these depressions. The tension of the spring 30 is such that when the knob is in a depression it will maintain the valve setting against displacement by shocks or jars, but at the same time will permit the knob to ride out of the depression when the cam disc is being rotated intentionally. The engagement of the forked end of the lever E with the piston valve stem will, of course, prevent any rotation of the lever E.

By reference to Fig. 2 of the drawing, it will be seen that when the main rotary valve plug is in an "open" or "on" position, the arm 24 will serve as a stop for the supplemental valve operating handle 24ª. It has been explained that the supplemental valve operating handle is in the path of travel of the arms 24 and 25. Fig. 2 of the drawing illustrates, in full line, the position of the arms 24 and 25 when the main plug valve is fully "open" or "on", while in dotted lines is illustrated the positions these arms assume when the main plug valve is in an "off" or "closed" position. Thus it will be clearly seen how the arm 24 acts as a stop for the supplemental valve operating handle 24ª and that whenever the main valve is turning to an "off" position the arm 25 engages the supplemental valve handle 24ª and moves it into a position beneath the "high" designation on the temperature dial.

This function is important, as it is highly desirable that the supplemental valve be positioned at "high" whenever the burner or range is started upon the initial opening of the main plug valve. This assures that the cooking top of the range is receiving the maximum heat when the range is first started and will continue to receive the maximum heat unless shutting off of the supplemental valve is deliberate and intentionally altered. This construction assures that the range top will be quickly heated when the range burner is first started unless the operator desires the operation to be otherwise.

The operation of the device is so obvious as to make further description unnecessary. It would be possible to control the fuel delivered to the burner by the rotary valve alone, but due to the very limited amount of rotary travel of the main valve from its "open" to its "closed" position a very close adjustment of this valve would be necessary to obtain any appreciable amount of adjusted control over the fuel delivered to the burner. It has been found that it is not practical or satisfactory to attempt a close control of the fuel by the main valve. The improved secondary control afforded by the secondary valve provides a medium by which a close and accurate control of the gas delivered to the burner and the size of the flame at the burner can be quickly and easily obtained by the range operator.

It should be understood that the secondary control could be utilized in combination with gas valves other than the rotary valve type without departing from the spirit of the present invention.

What I claim and desire to secure by Letters Patent is:

1. An improved device for controlling the flow of fuel to a burner or the like, comprising a housing having a fuel passageway therethrough, a rotary plug for opening and closing said passageway, a handle for operating said plug, said handle provided with a pair of arms arranged in separated relationship, a dial carrying designations indicating the setting of the plug, a supplemental valve in said housing passageway back of said rotary plug, said valve provided with an elongated stem, a movable member carrying a cam in operative engagement with said valve stem, a handle for operating said member, said handle positioned to move between the arms of said rotary plug handle, and designations on said dial to indicate the position of the supplemental valve by the position of the handle of the cam carrying member.

2. An improved gas control device, comprising a valve housing having a passageway therethrough, a valve for opening and closing said passageway, said valve provided with an elongated stem carrying an operating handle provided with arms arranged in separated relationship, a dial carrying designations to indicate the "on" and "off" positions of said valve, means to prevent said valve from moving past its "off" or "on" positions, a supplemental valve in said gas passageway back of the main valve, operative means including a handle for operating said supplemental valve, said supplemental valve operating handle positioned in the path of travel of the arms carried by the main valve operating handle, and designations on said dial to indicate the positioning of the said supplemental valve through the positioning of the supplemental valve operating handle.

3. An improved device for controlling the flow of fuel to a burner, comprising a valve housing having a fuel passageway therethrough, a rotary primary valve in said passageway and provided with a stem carrying an operating handle provided with a pair of arms in separated relationship, means to limit the rotary movement of said valve, a reciprocal secondary valve in said passageway back of said primary valve, a cam member loosely and rotatably mounted upon the stem of the primary valve, an operating handle for said member positioned within the path of travel of the arms of the primary valve operating handle, a lever loosely mounted on the stem of the primary valve, the secondary valve provided with a stem adapted to engage the cam of the cam member, resilient means urging one end of the lever against the stem of the secondary valve to maintain said stem in constant engagement with the cam, the other end of said lever being urged against the cam member and adapted to selectively engage stops carried by said member, and a dial co-operative with the operating handles of both of said valves to indicate the positions of said valves.

4. A structure such as defined in claim 3, wherein one of the arms of the primary valve operating handle when said valve is open serves as a stop for the opening movement of the secondary valve, and the other arm of said primary valve operating handle moves the secondary valve to a fully open position when the primary valve is moved to a closed position.

5. An improved fuel controlling device, comprising a valve housing having a fuel passageway therethrough, a primary valve in said housing for controlling the passage of fuel therethrough and provided with an outwardly extending stem carrying an operating handle, a secondary valve in said housing positioned back of said primary valve and providing a close control over the fuel passing said primary valve, a rotatable cam member arranged concentrically of said primary valve stem and provided with an operating handle positioned conveniently adjacent the operating handle of the primary valve, and an operative connection between said cam member and the secondary valve.

6. A structure such as defined in claim 5, wherein the secondary valve is provided with a stem adapted for engagement with the cam member, a spring pressed lever one end of which engages the stem of the secondary valve to normally hold said valve in an open position and to at all times hold the stem of said valve in operative engagement with the cam member.

7. A structure such as defined in claim 5, wherein the cam member in one face is provided with indentations, means is provided which resiliently engages said indentations for locking said cam member in any one of a plurality of adjusted positions.

8. A structure such as defined in claim 5, wherein the secondary valve is provided with a stem adapted to engage the cam member and the cam member is provided in one face with a plurality of indentations arranged in separated relationship, a spring pressed lever, one end of said lever engaging the stem of the secondary valve and normally holding said valve in an open position and at all times holding the stem of said valve in operative engagement with the cam member, and the other end of said lever adapted to selectively engage under resilient tension the indentations in said cam member for locking said member in any of a plurality of adjusted positions.

9. An improved device for providing a close control of the delivery of fuel to a burner or the like, comprising a fuel delivery passageway having therein a primary valve for initially controlling the passage of fuel through said passageway, a secondary valve in said fuel passageway back of said primary valve, means to operate said primary valve, means to operate said secondary valve, and means whereby upon movement of the primary valve towards a closed position the secondary valve is moved towards an open position.

10. A structure such as defined in claim 9, wherein the primary valve is a rotary valve and the secondary valve is of a reciprocatory type.

11. A structure such as defined in claim 9, wherein the operating means for the primary valve includes a handle provided with an extending arm, and said arm is adapted to engage the secondary valve operating means and constitutes the means which moves the secondary valve towards an open position upon movement of the primary valve towards a closed position.

12. An improved device for controlling the flow of fuel to a burner or the like, comprising a fuel passageway having therein a primary valve and a secondary valve, said valves provided with stems arranged in parallel relationship, an operating handle for the stem of the primary valve, a movable cam carrying member, an operative connection between the cam of said member and the stem of the secondary valve for operating said valve, said valves being independently operable to provide a close control of the fuel delivered to said burner.

13. A construction such as defined in claim 12, wherein the primary valve is a rotary valve and the secondary valve is of the reciprocatory type.

14. An improved device for controlling the flow of fuel to a burner or the like, comprising a fuel passageway having therein a primary valve for opening and closing said passageway, an operating handle for said valve, a secondary valve in said passageway back of said primary valve, a movably mounted cam for operating said secondary valve, a handle for operating said cam, and the handle of the primary valve operator and the operating handle for the cam being independently movable and movable in opposite directions to effect an opening and closing of their respective valves.

15. A construction such as defined in claim 14, wherein the primary valve handle is provided with a pair of arms arranged in separated relationship, the operating handle for the cam member being positioned between and in the path of said arms, and one of said arms upon movement of the primary valve towards a closed position engaging the cam operator and causing the secondary valve to move towards an open position.

16. A construction such as defined in claim 9, wherein the operating means for the secondary valve is in the form of a movable cam.

17. A construction such as defined in claim 9, wherein the primary valve is a rotary valve and the secondary valve is of a reciprocatory type, and the operating means for the secondary valve is in the form of a movable cam.

18. A structure such as defined in claim 9, wherein the operating means for the primary valve includes a projecting member, the operating means for the secondary valve includes a movable cam, and said projecting member adapted for operative connection with the cam and constituting means which causes the secondary valve to move towards an open position as the primary valve is moved towards a closed position.

BENJAMIN EDWARD MEACHAM.